(12) United States Patent  
Scheimberg et al.

(10) Patent No.: US 9,628,883 B1
(45) Date of Patent: Apr. 18, 2017

(54) WIRELESS MICROPHONE HAVING PLURAL PTT BUTTONS

(71) Applicants: Ruben Scheimberg, Valencia, CA (US); Tom Zeng, Shenzehn (CN)

(72) Inventors: Ruben Scheimberg, Valencia, CA (US); Tom Zeng, Shenzehn (CN)

(73) Assignee: Ruben Scheimberg, Valencia, CA (US)

(*) Notice: Subject to any disclaimer, the term of this patent is extended or adjusted under 35 U.S.C. 154(b) by 0 days.

(21) Appl. No.: 14/956,662

(22) Filed: Dec. 2, 2015

(51) Int. Cl.
| | |
|---|---|
| H04R 3/00 | (2006.01) |
| H04R 1/04 | (2006.01) |
| H04W 4/00 | (2009.01) |
| H04W 4/06 | (2009.01) |
| H04R 25/00 | (2006.01) |

(52) U.S. Cl.
CPC .............. *H04R 1/04* (2013.01); *H04R 25/554* (2013.01); *H04R 25/556* (2013.01); *H04W 4/008* (2013.01); *H04W 4/06* (2013.01); *H04R 2201/107* (2013.01); *H04R 2225/61* (2013.01); *H04R 2420/07* (2013.01); *H04R 2420/09* (2013.01); *H04R 2499/11* (2013.01)

(58) Field of Classification Search
CPC . H04R 1/04; H04R 1/08; H04R 25/43; H04R 25/554; H04R 25/558; H04R 2201/107; H04R 2225/51; H04R 2225/61; H04R 3/00; H04R 25/505; H04R 2420/07; H04R 2420/09; H04R 2499/11; H04M 1/05; H04M 1/6066; H04W 4/10

USPC ....... 381/74, 81, 91, 92, 111, 122, 123, 315, 381/365, 370, 375; 379/420.03, 430, 379/433.02; 455/41.1, 41.2

See application file for complete search history.

(56) References Cited

U.S. PATENT DOCUMENTS

| | | | |
|---|---|---|---|
| 7,818,037 B2* | 10/2010 | Lair ................... | H04M 1/6066 381/370 |
| 2012/0300958 A1* | 11/2012 | Klemmensen ......... | H04R 25/43 381/81 |
| 2015/0215749 A1* | 7/2015 | Teetzel ................ | H04W 4/10 455/518 |

* cited by examiner

*Primary Examiner* — Huyen D Le
(74) *Attorney, Agent, or Firm* — Intelligent Patent Service

(57) ABSTRACT

A wireless microphone having plural PTT buttons for selectively communicating wireless signals with two discrete remote devices. The wireless microphone having plural PTT buttons is operative to wirelessly transmit digital signals relating to sounds captured by its microphone either through a first Bluetooth channel broadcasting circuit whenever a first PTT button is engaged by a user or a second Bluetooth channel broadcasting circuit whenever a second PTT button is engaged by a user. Each Bluetooth channel broadcasting circuit may be paired with a discrete remote devices, thereby enabling real time wireless communication of electrical signals with each remote device. Through such connectivity, the wireless microphone having plural PTT buttons is also operative to receive wireless digital signals relating to remote sounds and reproduce the same over its speaker.

20 Claims, 6 Drawing Sheets

WIRELESS MICROPHONE HAVING PLURAL PTT BUTTONS

FIELD OF THE INVENTION

Figure 1:
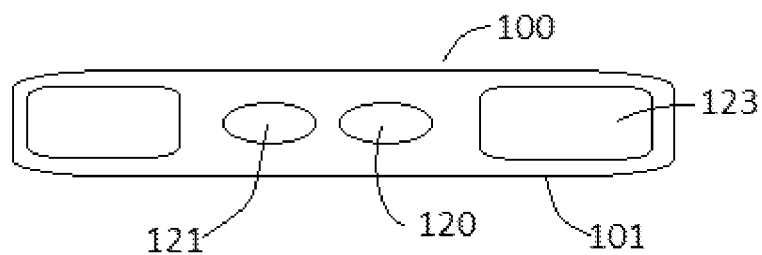
FIG. 1 is a left side elevational view of a wireless microphone having plural PTT buttons built in accordance the present invention.
Figure 2:
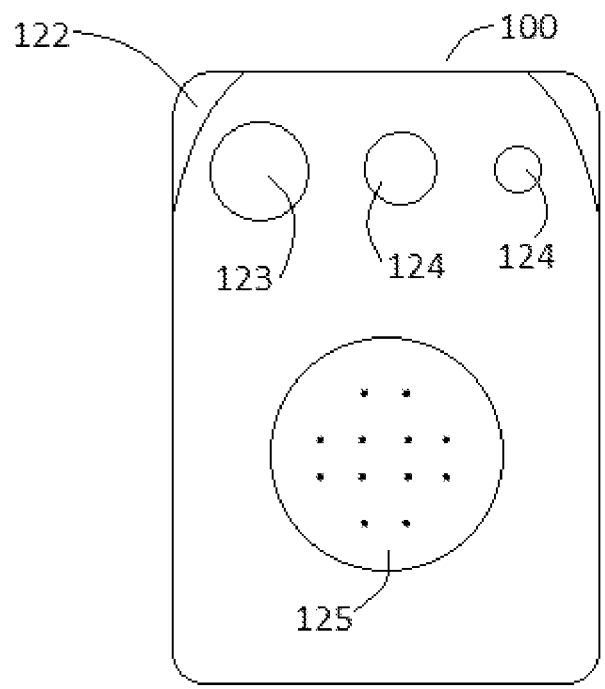
FIG. 2 is a front elevational view of a wireless microphone having plural PTT buttons built in accordance the present invention.
Figure 3:
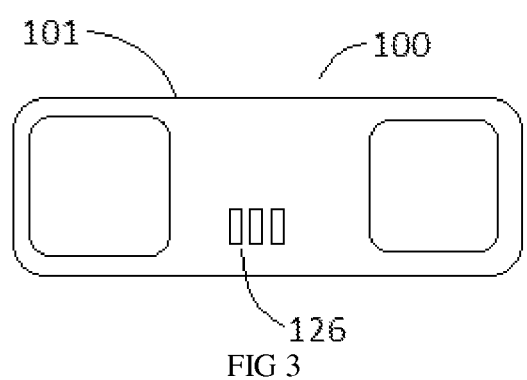
FIG. 3 is a top elevational view of a wireless microphone having plural PTT buttons built in accordance the present invention.

The invention is a wireless microphone having plural "push-to-talk" buttons.

SUMMARY OF THE INVENTION

A wireless microphone having plural PTT buttons for selectively communicating wireless signals with two discrete remote devices. The wireless microphone having plural PIT buttons is operative to wirelessly transmit digital signals relating to sounds captured by its microphone either through a first Bluetooth channel broadcasting circuit whenever a first PTT button is engaged by a user or a second Bluetooth channel broadcasting circuit whenever a second PTT button is engaged by a user. Each Bluetooth channel broadcasting circuit may be paired with a discrete remote devices, thereby enabling real time wireless communication of electrical signals with each remote device.

DETAILED DESCRIPTION OF THE INVENTION

Referring now to the drawings and in particular FIGS. 1, 2, 3, 4, 5, and 6, a wireless microphone having plural PTT (or, "push-to-talk") buttons 100 is shown having a three dimensional body 101 defined by a discrete top exterior surface, bottom exterior surface, front exterior surface, rear exterior surface, left exterior surface and right exterior surface. The exterior surfaces of the body 101 combine to form a portable housing that includes a plurality of exterior structural components, internal electronic components, and exterior interface components.

Figure 4:
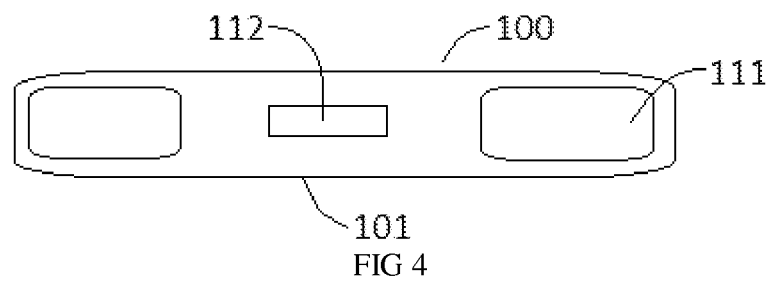
FIG. 4 is a right side elevational view of a wireless microphone having plural PTT buttons built in accordance the present invention having its auxiliary cover and USB port cover in place.
Figure 5:
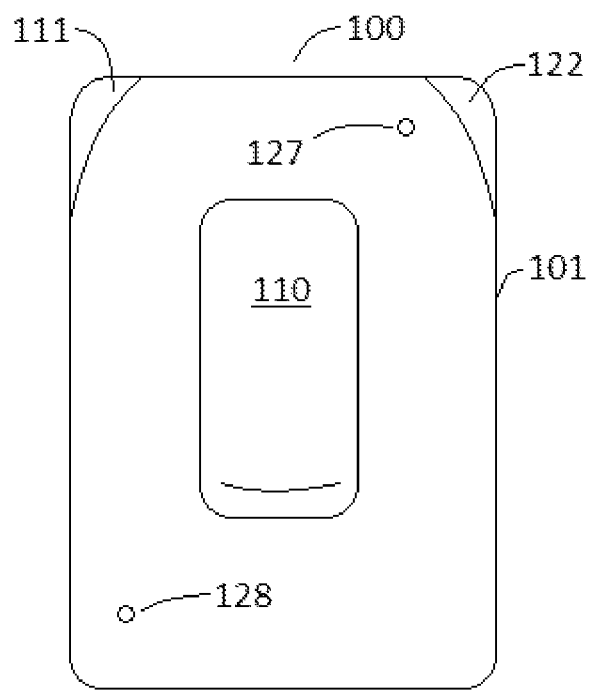
FIG. 5 is a rear elevational view of a wireless microphone having plural PTT buttons built in accordance the present invention.
Figure 6:
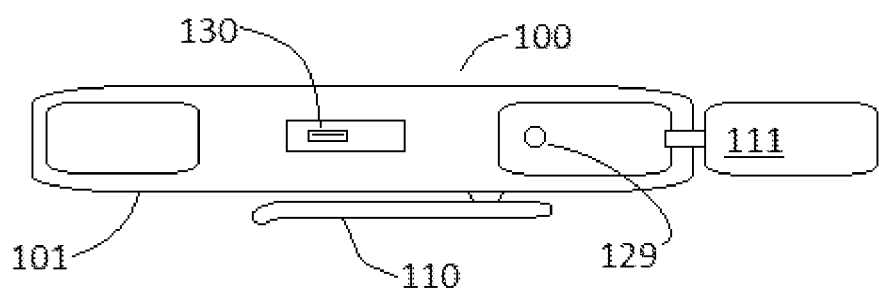
FIG. 6 is a right elevational view of a wireless microphone having plural PTT buttons built in accordance the present invention having its auxiliary cover flipped up and USB port cover removed.

The exterior structural components include an attachment element 110, edge cover 111, and a side cover 112. In the preferred embodiment, the attachment element 110 defines a rotating spring biased clip, the edge cover 111 defines a hingedly attached flip corner cover, and the side cover 112 defines a USB port cover with a textured surface. As illustrated in FIGS. 4 and 6, respectively, the edge cover 111 is selectively positionable in a closed position and an open position and the side cover 112 is selectively removable. In one preferred variation, the clip is rotatable to allow attachment of the microphone to the user's clothing at varying angles.

The housed inside the body 101 are a plurality of electrically interconnected internal electronic components which are operative to allow the wireless microphone having plural PTT buttons 100 to perform its sound capture, sound related electrical signal processing, sound production and reproduction, and sound related electrical signal wireless communicating functions, including a microphone, a speaker, a controller, a battery, an analog to digital converter ("ADC"), and an antenna, each having two digital to analog converters ("DAC") selectively switched into communication with the antenna by the plural PTT buttons. These internal electronic components work together to provide selective sound capture, generation of electrical signals from the captured sound, processing of generated electrical signals into digital signals, and transmission of digital signals to remote devices, as well as receipt of digital signals corresponding to remotely generated sound, processing of digital signals corresponding to remotely generated sound, and the reproduction of remotely generated sound.

The exterior interface components allow a user to control the operation of the internal electronic components. The exterior interface components include a manual power actuator 120, a manual emergency actuator 121, a first manual transmission actuator 122, a second manual transmission actuator 123, two volume actuators 124, a sound output area 125, sound input slot 126, a lighting element 127, an internal engagement aperture 128, an electrical output port 129, and a charging port 130. In the preferred embodiment, the manual power actuator 120, manual emergency actuator 121, first manual transmission actuator 122, second manual transmission actuator 123, and two volume actuators 124 define conventional push buttons that operate biased switches. In this regard, it is noted that the first manual transmission actuator 122 and second manual transmission actuator 123 define in the preferred embodiment a first momentary PTT button and a second momentary PTT button, respectively.

It is appreciated that the manual power actuator 120 is operative to selectively avail electrical power from the battery to the components of the wireless microphone having plural PTT buttons 100, the manual emergency actuator 121 is operative to selectively generate and transmit an alarm signal that can cause an alarm sound to be produced by the speaker and/or cause the lighting element 127 to illuminate, the first manual transmission actuator 122 and second manual transmission actuator 123 selectively operate the internal electronic components inside the body 101 (as detailed below) to cause the capture of sound and ultimately the transmission of electrical signals related to the captured sound, and the two volume actuators 124 are operative to selectively increase and decrease the volume of sound emitted from the speaker.

It is specifically contemplated that the first manual transmission actuator 122 and second manual transmission actuator 123 are advantageously disposed on discrete exterior surfaces of the body so that they extend in distinct directions (and are engaged by depressing them in distinct directions). It is understood that such a design makes it easier for a user to engage one or the other individually without getting them confused or inadvertently engaging both (compared to if they were in different locations on the same exterior surface). In the illustrated embodiment, the first manual transmission actuator 122 is positioned on a corner of the body 101 between the top surface and left surface while the second manual transmission actuator 123 is positioned on the front surface of the body 101.

In the preferred embodiment, the sound output area 125 defines a plurality of holes in the body 101 which enable sound waves produced by the speaker to exit the body 101, while the sound input slot 126 defines a plurality of holes in the body 101 which enable sound waves from outside the body to enter the body 101 at a location adjacent to the microphone. The internal engagement aperture 128 defines a single hole in the body which is positioned to enable a user to selectively engage the internal components of the wireless microphone having plural PTT buttons 100 without opening the body 101. In one embodiment, pressing an object into the internal engagement aperture 128 resets the wireless microphone having plural PTT buttons 100.

In the preferred embodiment, the lighting element 127 defines an LED light, the electrical output port 129 defines a conventional headphone port to allow a conventional headphone jack to be connected, and the charging port 130 defines a conventional USB port to allow for the battery to be charged through a conventional USB connector.

Figure 7:
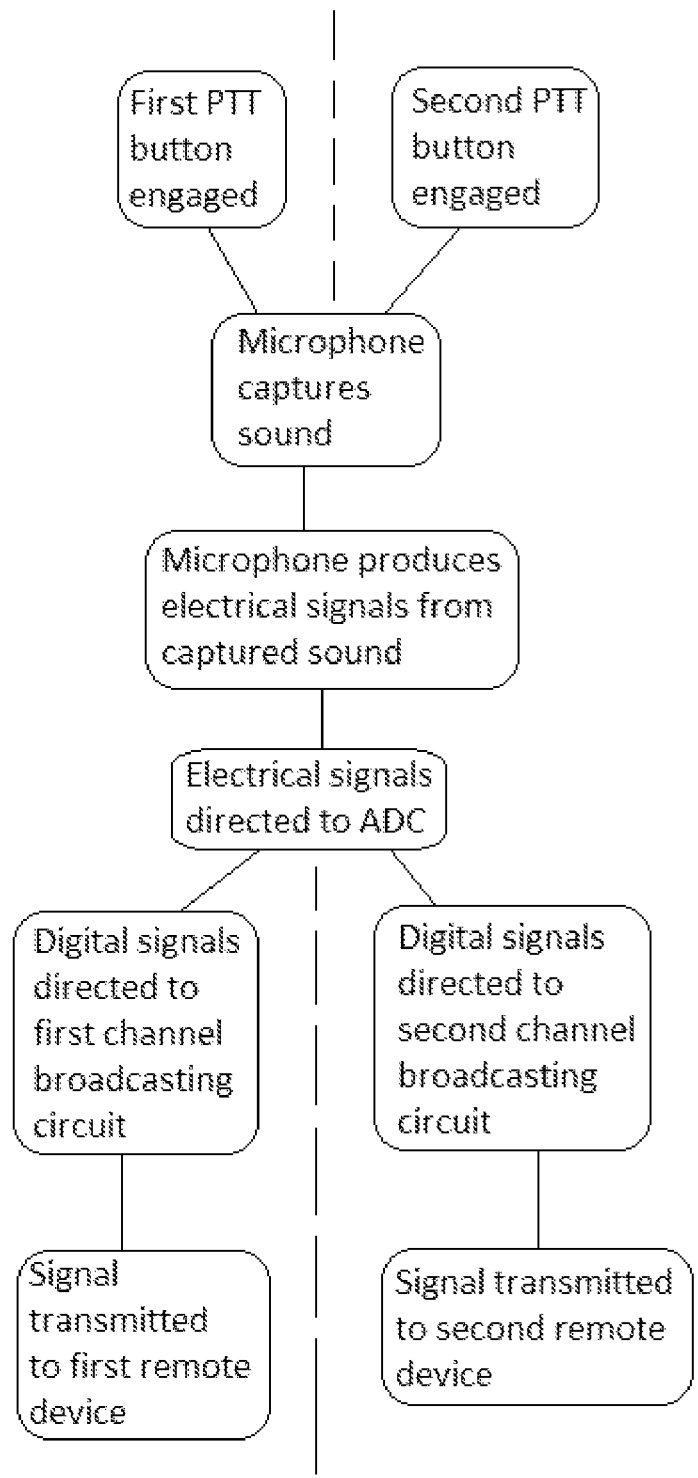
FIG. 7 shows the process through which signals relating to captured audio are selectively transmitted wirelessly to distinct remote devices in accordance the present invention.

Referring now to FIG. 7, the wireless microphone having plural PTT buttons is operative to wirelessly transmit digital signals relating to sounds captured by its microphone to a desired remote device whenever the first manual transmission actuator 122 or second manual transmission actuator 123 is engaged by a user. In one embodiment, the first manual transmission actuator 122 is associated with a first Bluetooth channel broadcasting circuit 131, while the second manual transmission actuator 123 is associated with a second Bluetooth channel broadcasting circuit 132. It is contemplated that the first Bluetooth channel broadcasting circuit 131 and the second Bluetooth channel broadcasting circuit 132 may each be paired with a discrete remote devices, thereby enabling the wireless microphone having plural PTT buttons to wirelessly communicate electrical signals with two distinct systems. In one preferred variation, the first Bluetooth channel broadcasting circuit 131 and the second Bluetooth channel broadcasting circuit 132 may share the same physical Bluetooth broadcasting circuitry, however when triggered by the plural manual transmission actuators, the physical Bluetooth broadcasting circuitry will transmit on separate channels, where each plural manual transmission actuator triggers broadcasting on a distinct channel. In this variation, when the circuitry between the discrete manual transmission actuators and the physical Bluetooth broadcasting circuitry are taken together, each manual transmission actuator represents a distinct circuit when combined as a system with the shared physical Bluetooth broadcasting circuitry. In another preferred embodiment, plural Bluetooth broadcasting circuits are used, for the plural manual transmission actuators. In another preferred variation, any suitable radio communication standard and circuitry other than Bluetooth may be employed. Preferably the first Bluetooth channel broadcasting circuit 131 and the second Bluetooth channel broadcasting circuit 132 transmit their signals through a shared antenna 133. There may, however, be any suitable number and design of antennae used by the system.

In this regard, engaging the first manual transmission actuator 122 causes sound which is picked up by the microphone while the first manual transmission actuator 122 is engaged to be captured by the microphone and transmitted in the form of electrical signals over the first Bluetooth channel broadcasting circuit 131 to the remote device with which the first Bluetooth channel broadcasting circuit 131 has been paired. Such transmission is accomplished by generating with the microphone an electrical signal which directly corresponds to any sound picked up by the microphone (such as a user speaking near the microphone), directing the electrical signals generated by the microphone to the ADC, converting the electrical signals produced by the microphone into digital signals, directing the digital signals converted by the ADC to the first Bluetooth channel broadcasting circuit 131, and transmitting the digital signals converted by the ADC wirelessly over the first Bluetooth channel broadcasting circuit 131.

On the other hand, engaging the second manual transmission actuator 123 causes sound which is picked up by the microphone while the second manual transmission actuator 123 is engaged to be captured by the microphone and transmitted in the form of electrical signals over the second Bluetooth channel broadcasting circuit 132 to the remote device with which the second Bluetooth channel broadcasting circuit 132 has been paired. Such transmission is accomplished by generating with the microphone an electrical signal which directly corresponds to any sound picked up by the microphone (such as a user speaking near the microphone), directing the electrical signals generated by the microphone to the ADC, converting the electrical signals produced by the microphone into digital signals, directing the digital signals converted by the ADC to the second Bluetooth channel broadcasting circuit 132, and transmitting the digital signals converted by the ADC wirelessly over the second Bluetooth channel broadcasting circuit 132.

Figure 8:
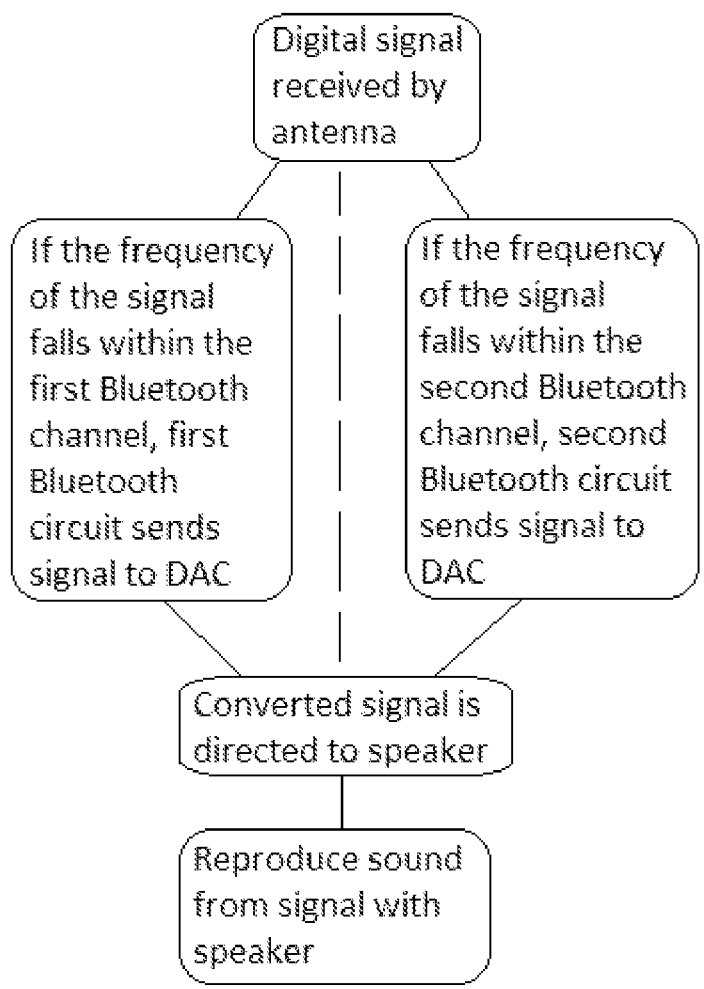
FIG. 8 shows the process through which signals relating to remotely generated audio are received and audibly broadcast in accordance the present invention.
Figure 9:
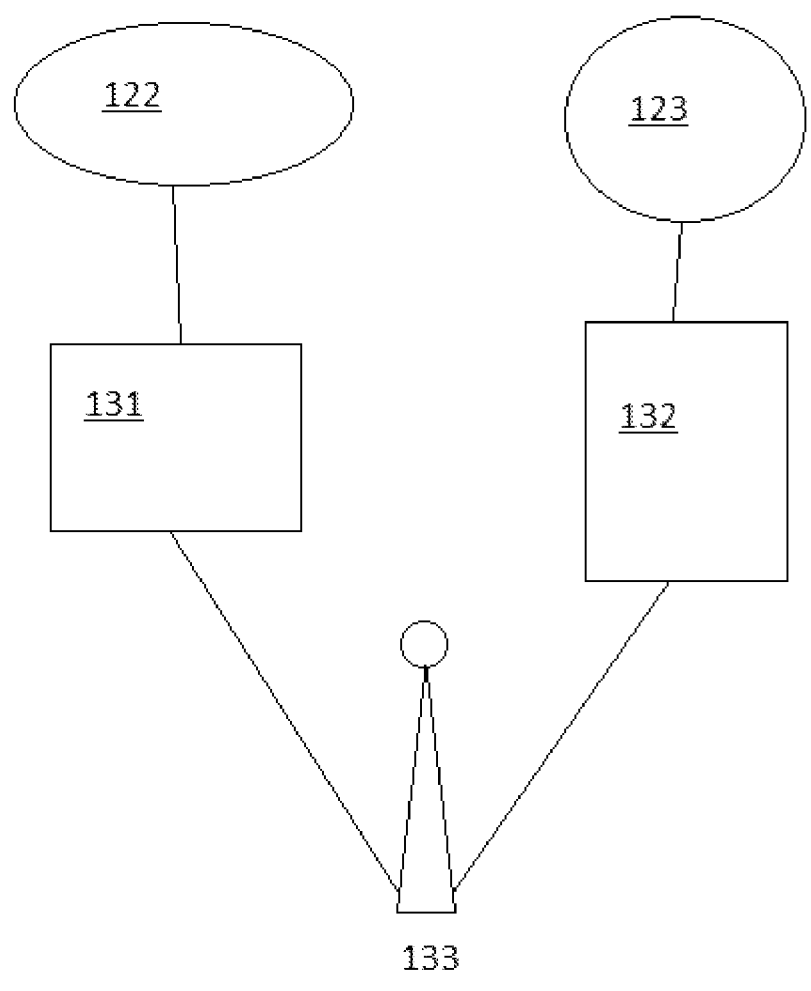
FIG. 9 is a schematic representation of a preferred variation of the system of the preferred embodiments in which two separate Bluetooth broadcasting circuits are used, each dedicated to a given selectable channel.
Figure 10:
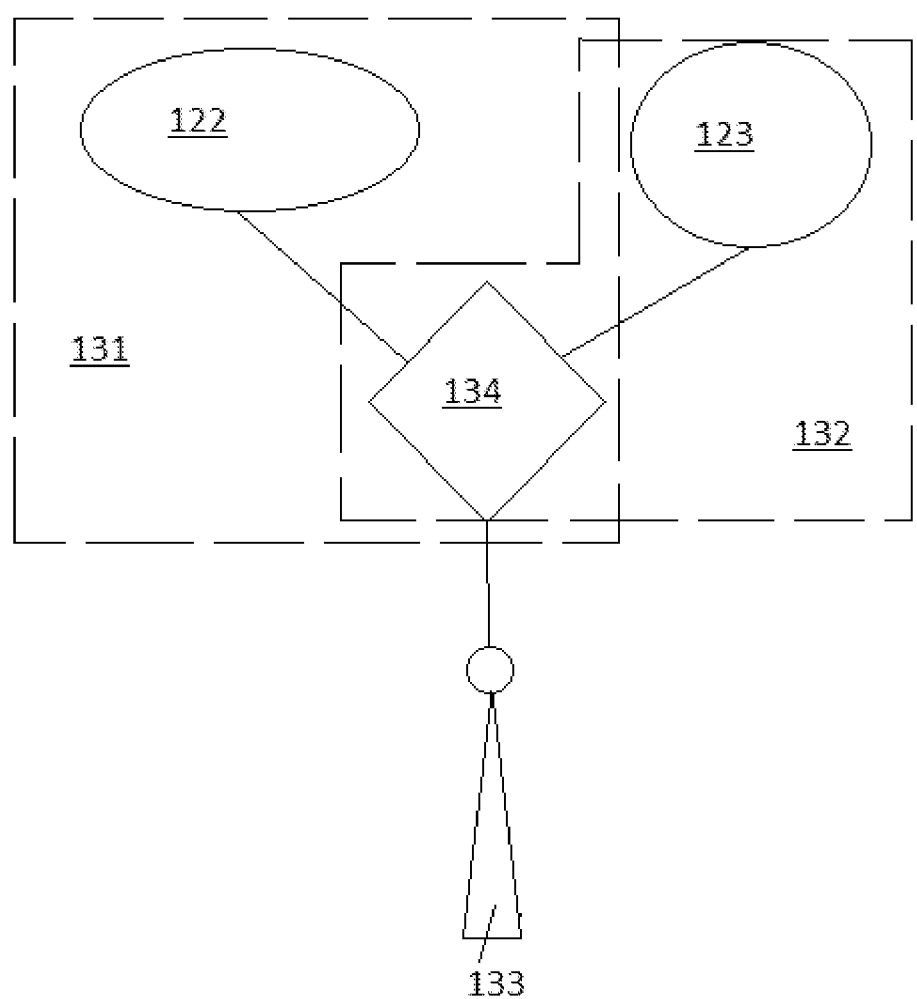
FIG. 10 is a schematic representation of a preferred variation of the system of the preferred embodiments in which a single physical Bluetooth broadcasting circuit is connected in a plurality of separate circuits with a plurality of manual transmission actuators, forming a plurality of broadcasting circuits sharing a central Bluetooth broadcasting circuit, and each dedicated to a given selectable channel.

Referring now to FIG. 8, the wireless microphone having plural PTT buttons is also operative to receive wireless digital signals relating to remote sounds and reproduce the same over its speaker. Whenever wireless digital signals relating to remote sounds are received by either the first or second Bluetooth channel broadcasting circuit 132, the digital signals relating to remote sounds are directed to the DAC, converted by the DAC for use by the speaker and reproduced by the speaker.

It is appreciated, however, that the presence of two discrete Bluetooth channel broadcasting circuit could potentially result in the simultaneous receipt of two distinct wireless digital signals relating to remote sounds. Accordingly, in one embodiment, when discrete digital signals are received simultaneously by first and second Bluetooth channel broadcasting circuit 131 and 132, the digital signals are first converted by the respective DAC dedicated to the Bluetooth channel broadcasting circuit over which the digital signal was received and the remote sounds are reproduced in real time by the speaker (with overlap).

It is understood that in alternate embodiments, alternate wireless technology standards may be employed to facilitate wireless transmission of electrical signals. As such, alternate wireless signal transmission adapters and/or radio wave antennae may be employed in addition to or in the alternative to Bluetooth channel broadcasting circuit.

The present invention has been shown and described herein in what is considered to be the most practical and preferred embodiment. It is recognized, however, that departures may be made therefrom within the scope of the invention and that obvious modifications will occur to a person skilled in the art.

What is claimed is:

1. A wireless microphone assembly, comprising:
a portable housing;
at least one microphone mounted in the portable housing;
a plurality of wireless adapters mounted in the portable housing, wherein said wireless adapters are configured to transmit electrical signals wirelessly with at least a first remote device and a second remote device; and
a discrete first manual transmission actuator and a discrete second manual transmission actuator mounted to said portable housing, wherein manual actuation of said first manual transmission actuator causes at least one of the wireless adapters to transmit in real time electrical signals which correspond to sound captured by the microphone to the first remote device, and manual actuation of said second manual transmission actuator causes at least one of the wireless adapters to transmit in real time electrical signals which correspond to sound captured by the microphone to the second remote device.

2. The wireless microphone assembly of claim 1, additionally comprising an electrical signal processing member operative to condition electrical signals generated by the microphone prior to the electrical signals being transmitted by at least one of the wireless adapters.

3. The wireless microphone assembly of claim 2, wherein:
wherein said electrical signals generated by the microphone define analog signals; and
said electrical signal processing member conditions electrical signals generated by the microphone by converting the analog signal into a digital electrical signal.

4. The wireless microphone assembly of claim 2, wherein said electrical signal processing member defines at least one analog to digital converter.

5. The wireless microphone assembly of claim 1, wherein:
said plurality of wireless adapters defines at least a first Bluetooth channel broadcasting circuit and a second Bluetooth channel broadcasting circuit;
said first remote device is paired with said first Bluetooth channel broadcasting circuit; and
said second remote device is paired with said second Bluetooth channel broadcasting circuit.

6. The wireless microphone assembly of claim 1, additionally comprising at least one speaker integral with said portable housing and operatively connected to a power source.

7. The wireless microphone assembly of claim 6, wherein said wireless adapters are additionally configured to receive electrical signals which correspond to sound wirelessly from at least the first remote device and the second remote device.

8. The wireless microphone assembly of claim 7, wherein said speaker is adapted to produce sound in real time from the electrical signals received wirelessly from at least one of the first remote device and the second remote device.

9. The wireless microphone assembly of claim 8, wherein said speaker is adapted to produce sound in real time from electrical signals received wirelessly from both the first remote device and the second remote device sequentially and simultaneously.

10. The wireless microphone assembly of claim 9, additionally comprising at least a first incoming electrical signal processing member and second incoming electrical signal processing member, each operative to independently condition electrical signals received wirelessly, thereby adapting the speaker to produce sound originating from both the first remote device and the second remote device simultaneously.

11. The wireless microphone assembly of claim 10, wherein said electrical signals received wirelessly define digital electrical signals; and
said incoming electrical signal processing members condition the digital electrical signals received wirelessly by converting the digital electrical signal into an analog electrical signal.

12. The wireless microphone assembly of claim 10, wherein said incoming electrical signal processing members each defines at least one digital to analog converter.

13. A wireless microphone assembly, comprising:
a portable housing defined by a three dimensional body;
at least one microphone integral with said portable housing and operatively connected to a power source, wherein said at least one microphone is operative to capture sound and generate electrical signals from the captured sound;
a plurality of wireless adapters integral with said portable housing and operatively connected to the power source, wherein said wireless adapters are configured to transmit electrical signals wirelessly with at least a first remote device and a second remote device;
a discrete first manual transmission actuator and a discrete second manual transmission actuator integral with said portable housing, wherein manual actuation of said first manual transmission actuator causes at least one of the wireless adapters to transmit in real time electrical signals which correspond to sound captured by the microphone to the first remote device and manual actuation of said second manual transmission actuator causes at least one of the wireless adapters to transmit in real time electrical signals which correspond to sound captured by the microphone to the second remote device;
an electrical signal processing member operative to condition electrical signals generated by the microphone prior to the electrical signals being transmitted by at least one of the wireless adapters;
at least one speaker integral with said portable housing and operatively connected to the power source, wherein said wireless adapters are additionally configured to receive electrical signals which correspond to sound wirelessly from at least the first remote device and the second remote device; and
said speaker is adapted to produce sound in real time from the electrical signals received wirelessly from at least one of the first remote device and the second remote device.

14. The wireless microphone assembly of claim 13, wherein:
wherein said electrical signals generated by the microphone define analog signals; and
said electrical signal processing member conditions electrical signals generated by the microphone by converting the analog signal into a digital electrical signal.

15. The wireless microphone assembly of claim 13, wherein said electrical signal processing member defines at least one analog to digital converter.

16. The wireless microphone assembly of claim 13, wherein:
    said plurality of wireless adapters defines at least a first Bluetooth channel broadcasting circuit and a second Bluetooth channel broadcasting circuit;
    said first remote device is paired with said first Bluetooth channel broadcasting circuit; and
    said second remote device is paired with said second Bluetooth channel broadcasting circuit.

17. The wireless microphone assembly of claim 13, wherein said speaker is adapted to produce sound in real time from electrical signals received wirelessly from both the first remote device and the second remote device sequentially and simultaneously.

18. The wireless microphone assembly of claim 17, additionally comprising at least a first incoming electrical signal processing member and second incoming electrical signal processing member, each operative to independently condition electrical signals received wirelessly, thereby adapting the speaker to produce sound originating from both the first remote device and the second remote device simultaneously.

19. The wireless microphone assembly of claim 18, wherein said electrical signals received wirelessly define digital electrical signals; and
    said incoming electrical signal processing members condition the digital electrical signals received wirelessly by converting the digital electrical signal into an analog electrical signal.

20. The wireless microphone assembly of claim 18, wherein said incoming electrical signal processing members each defines at least one digital to analog converter.

* * * * *